(12) United States Patent
Kanazawa et al.

(10) Patent No.: US 10,967,447 B2
(45) Date of Patent: Apr. 6, 2021

(54) METAL WIRE, SAW WIRE, CUTTING APPARATUS, AND METHOD OF MANUFACTURING METAL WIRE

(71) Applicant: PANASONIC INTELLECTUAL PROPERTY MANAGEMENT CO., LTD., Osaka (JP)

(72) Inventors: Tomohiro Kanazawa, Osaka (JP); Naoki Kohyama, Osaka (JP); Yoshihiro Iguchi, Osaka (JP); Yuuki Sasagawa, Osaka (JP); Tetsuji Shibata, Osaka (JP); Toshiyuki Tani, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 310 days.

(21) Appl. No.: 16/256,636

(22) Filed: Jan. 24, 2019

(65) Prior Publication Data

US 2019/0232404 A1 Aug. 1, 2019

(30) Foreign Application Priority Data

Jan. 29, 2018 (JP) .............................. JP2018-012955

(51) Int. Cl.
*B23D 61/18* (2006.01)
*B23D 65/00* (2006.01)
(Continued)

(52) U.S. Cl.
CPC ....... *B23D 61/185* (2013.01); *B23D 57/0007* (2013.01); *B23D 57/0023* (2013.01); *B23D 61/18* (2013.01); *B23D 65/00* (2013.01); *B24B 27/0633* (2013.01); *B28D 5/045* (2013.01); *C22C 27/04* (2013.01); *C22C 38/12* (2013.01); *C25D 15/02* (2013.01)

(58) Field of Classification Search
CPC .... B24B 27/0633; B23D 65/00; B23D 61/18; B23D 61/185; B23D 57/00; B23D 57/0007; B23D 57/0023; B23D 57/0069; B23D 57/003; B28D 5/042; B28D 5/045; B28D 1/08; B22F 5/12; C25D 15/02; C22C 38/12; C22C 27/04
USPC ...................................... 125/16.01, 16.02, 21
See application file for complete search history.

(56) References Cited

U.S. PATENT DOCUMENTS 3,503,108 A * 3/1970 Besha ................. B05B 13/0442
407/30
4,015,931 A * 4/1977 Thakur ................ B23D 61/185
125/21

(Continued)

FOREIGN PATENT DOCUMENTS

GB 1435250 A * 5/1976 ........... B23D 61/185
JP 2008-213111 9/2008
JP 6249319 12/2017

*Primary Examiner* — Eileen P Morgan
(74) *Attorney, Agent, or Firm* — Greenblum & Bernstein, P.L.C.

(57) ABSTRACT

A metal wire containing tungsten is provided. A tungsten content of the metal wire is at least 90 wt %. A tensile strength of the metal wire is at least 4000 MPa. An elastic modulus of the metal wire is at least 350 GPa and at most 450 GPa. A diameter of the metal wire is at most 60 μm. An average crystal grain size of the metal wire in a cross-section orthogonal to an axis of the metal wire is at most 0.20 μm.

12 Claims, 6 Drawing Sheets

(51) Int. Cl.
  *B23D 57/00* (2006.01)
  *B28D 5/04* (2006.01)
  *C22C 38/12* (2006.01)
  *C22C 27/04* (2006.01)
  *B24B 27/06* (2006.01)
  *C25D 15/02* (2006.01)

(56) References Cited

U.S. PATENT DOCUMENTS

| | | | | |
|---|---|---|---|---|
| 4,055,700 | A * | 10/1977 | Ronnquist | B23D 61/185 |
| | | | | 428/366 |
| 4,139,659 | A * | 2/1979 | Ronnquist | B23D 61/185 |
| | | | | 427/249.15 |
| 5,519,938 | A * | 5/1996 | Kojima | H01L 21/4878 |
| | | | | 29/890.03 |
| 5,715,806 | A * | 2/1998 | Tonegawa | B28D 5/0058 |
| | | | | 125/1 |
| 6,065,462 | A * | 5/2000 | Hodsden | B23D 61/185 |
| | | | | 125/21 |
| 6,915,796 | B2 * | 7/2005 | Sung | B23D 61/185 |
| | | | | 125/12 |
| 9,254,552 | B2 * | 2/2016 | Tian | B23D 65/00 |
| 2004/0244879 | A1 * | 12/2004 | Tanaka | H01J 1/14 |
| | | | | 148/514 |
| 2005/0183713 | A1 * | 8/2005 | Takeuchi | B28D 5/045 |
| | | | | 125/21 |
| 2007/0224100 | A1 * | 9/2007 | Kaner | B24D 3/02 |
| | | | | 423/276 |
| 2008/0261499 | A1 * | 10/2008 | Tani | B24D 3/06 |
| | | | | 451/528 |
| 2011/0009039 | A1 * | 1/2011 | Balagani | B23D 65/00 |
| | | | | 451/533 |
| 2011/0100347 | A1 * | 5/2011 | Branagan | C22C 38/00 |
| | | | | 125/21 |
| 2011/0319931 | A1 * | 12/2011 | Esaki | C22C 27/04 |
| | | | | 606/222 |
| 2012/0017741 | A1 * | 1/2012 | Lange | B28D 5/042 |
| | | | | 83/651.1 |
| 2013/0061535 | A1 * | 3/2013 | Tian | B23D 65/00 |
| | | | | 51/309 |
| 2013/0206126 | A1 * | 8/2013 | Pietsch | B28D 5/007 |
| | | | | 125/21 |
| 2014/0011434 | A1 * | 1/2014 | Puzemis | B24D 11/00 |
| | | | | 451/537 |
| 2014/0013675 | A1 * | 1/2014 | Tian | B24B 27/0633 |
| | | | | 51/309 |
| 2014/0017984 | A1 * | 1/2014 | Rehrig | B28D 1/06 |
| | | | | 451/529 |
| 2014/0017985 | A1 * | 1/2014 | Tian | B28D 5/045 |
| | | | | 451/533 |
| 2014/0150766 | A1 * | 6/2014 | Che | C09K 3/1445 |
| | | | | 125/16.02 |
| 2014/0311472 | A1 * | 10/2014 | Tian | B24D 11/00 |
| | | | | 125/21 |
| 2015/0028738 | A1 * | 1/2015 | Aoyama | H01J 61/0735 |
| | | | | 313/310 |
| 2015/0040884 | A1 * | 2/2015 | Ueda | B24B 27/0633 |
| | | | | 125/21 |
| 2015/0083104 | A1 * | 3/2015 | Pietsch | B23D 57/0061 |
| | | | | 125/21 |
| 2015/0314484 | A1 * | 11/2015 | Pietsch | B28D 5/045 |
| | | | | 125/21 |
| 2016/0082533 | A1 * | 3/2016 | Ly | C25D 3/562 |
| | | | | 125/21 |
| 2016/0121413 | A1 * | 5/2016 | Ly | B28D 5/04 |
| | | | | 125/21 |
| 2016/0375514 | A1 * | 12/2016 | Tian | B24D 18/0018 |
| | | | | 51/309 |
| 2018/0281231 | A1 | 10/2018 | Kanazawa et al. | |
| 2018/0326517 | A1 * | 11/2018 | Kanazawa | C25D 15/00 |
| 2018/0326518 | A1 | 11/2018 | Kanazawa et al. | |
| 2018/0326519 | A1 * | 11/2018 | Kanazawa | B21C 9/00 |

* cited by examiner

METAL WIRE, SAW WIRE, CUTTING APPARATUS, AND METHOD OF MANUFACTURING METAL WIRE

CROSS REFERENCE TO RELATED APPLICATION

This application claims the benefit of priority of Japanese Patent Application Number 2018-012955 filed on Jan. 29, 2018, the entire content of which is hereby incorporated by reference.

BACKGROUND

1. Technical Field

The present disclosure relates to a metal wire, a saw wire, a cutting apparatus, and a method of manufacturing the metal wire.

2. Description of the Related Art

A multi-wire saw for slicing a silicon ingot using wires composed of piano wire that is high in a tensile strength has been conventionally known (see, for example, Japanese Unexamined Patent Application Publication No. 2008-213111).

SUMMARY

However, there is a problem that the piano wire is low in an elastic modulus and hardness. In addition, the piano wire is difficult to render thinner. For that reason, a metal wire which is thin and high in each of a tensile strength, an elastic modulus, and hardness is desired as a metal wire to replace the piano wire.

In view of the above, an object of the present disclosure is to provide a metal wire and a saw wire which are thin and high in each of a tensile strength, an elastic modulus, and hardness, a cutting apparatus including the saw wire, and a method of manufacturing the metal wire.

In order to achieve the above-described object, a metal wire according to an aspect of the present disclosure is a metal wire containing tungsten. In the metal wire, a tungsten content of the metal wire is at least 90 wt %, a tensile strength of the metal wire is at least 4000 MPa, an elastic modulus of the metal wire is at least 350 GPa and at most 450 GPa, a diameter of the metal wire is at most 60 μm, and an average crystal grain size of the metal wire in a cross-section orthogonal to an axis of the metal wire is at most 0.20 μm.

In addition, a saw wire according to an aspect of the present disclosure includes the above-described metal wire.

Furthermore, a cutting apparatus according to an aspect of the present disclosure includes the above-described saw wire.

In addition, a method of manufacturing a metal wire according to an aspect of the present disclosure is a method of manufacturing a metal wire containing tungsten. The method includes forming the metal wire, wherein a tungsten content of the metal wire is at least 90 wt %, a tensile strength of the metal wire is at least 4000 MPa, an elastic modulus of the metal wire is at least 350 GPa and at most 450 GPa, a diameter of the metal wire is at most 60 μm, and an average crystal grain size of the metal wire in a cross-section orthogonal to an axis of the metal wire is at most 0.20 μm.

According to the present disclosure, it is possible to provide a metal wire and a saw wire which are thin and high in each of the tensile strength, the elastic modulus, and the hardness, a cutting apparatus including the saw wire, and a method of manufacturing the metal wire.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

The following describes in detail a metal wire and a saw wire according to an embodiment of the present disclosure, with reference to the drawings. It should be noted that the embodiment described below indicates one specific example of the present disclosure. The numerical values, shapes, materials, structural components, the disposition and connection of the structural components, etc. described in the following embodiment are mere examples, and do not intend to limit the present disclosure. Furthermore, among the structural components in the following embodiment, structural components not recited in the independent claims are described as arbitrary structural components.

In addition, each diagram is a schematic diagram and not necessarily strictly illustrated. Accordingly, for example, scale sizes, etc. are not necessarily exactly represented. In each of the diagrams, substantially the same structural components are assigned with the same reference signs, and redundant descriptions will be omitted or simplified.

In addition, a term, such as "parallel" or "equal", representing a relationship between the components as well as a term, such as "circular", representing a form, and a numerical range are used in the present description. Such terms and range are each not representing only a strict meaning of the term or range, but implying that a substantially same range, e.g., a range that includes even a difference as small as few percentages, is connoted in the term or range.

EMBODIMENT (Cutting Apparatus)

Figure 1:
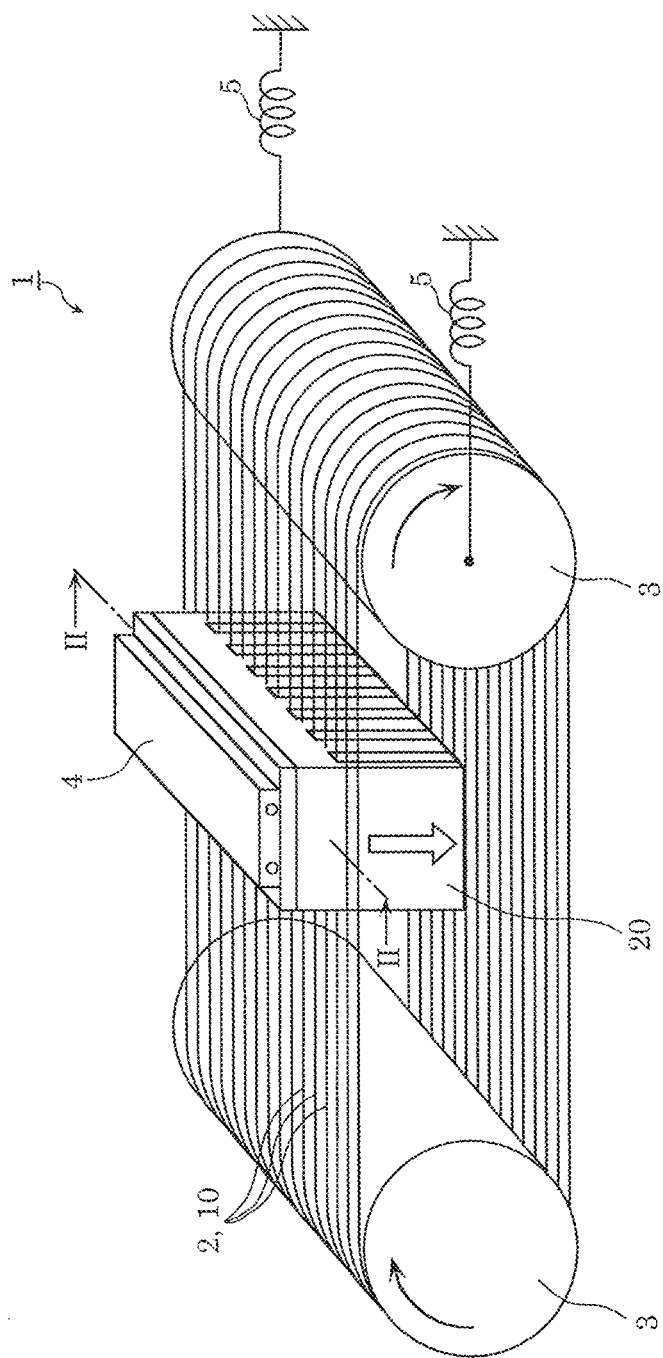
FIG. 1 is a perspective view which illustrates a cutting apparatus according to an embodiment.

First, an overview of a cutting apparatus including a saw wire according to an embodiment will be described with reference to FIG. 1. FIG. 1 is a perspective view which illustrates cutting apparatus 1 according to the embodiment.

As illustrated in FIG. 1, cutting apparatus 1 is a multi-wire saw including saw wire 2. Cutting apparatus 1 produces wafers by, for example, cutting ingot 20 into thin slices. Ingot 20 is, for instance, a silicon ingot including single-crystal silicon. More specifically, cutting apparatus 1 simultaneously produces a plurality of silicon wafers by slicing ingot 20 using a plurality of saw wires 2.

It should be noted that ingot 20 is a silicon ingot but is not limited to such. For example, an ingot including other substance such as silicon carbide or sapphire may be employed. Alternatively, an object to be cut by cutting apparatus 1 may be concrete, glass, etc.

According to the present embodiment, saw wire 2 includes metal wire 10. More specifically, saw wire 2 is quite simply metal wire 10.

As illustrated in FIG. 1, cutting apparatus 1 further includes two guide rollers 3, ingot holder 4, and tension releasing device 5.

A single saw wire 2 is looped multiple times over two guide rollers 3. Here, for convenience of explanation, one loop of saw wire 2 is regarded as one saw wire 2, and it is assumed that a plurality of saw wires 2 are looped over two guide rollers 3. Stated differently, in the description below, the plurality of saw wires 2 form a single continuous saw wire 2. It should be noted that the plurality of saw wires 2 may be a plurality of saw wires that are separated from one another.

Each of the two guide rollers 3 rotates in the state in which the plurality of saw wires 2 are straightly tightened with a predetermined tension, and thereby causes the plurality of saw wires 2 to rotate at a predetermined speed. The plurality of saw wires 2 are disposed in parallel to one another and are equally spaced. More specifically, each of the two guide rollers 3 is provided with grooves positioned at predetermined intervals for saw wires 2 to fit in. The intervals between the grooves are determined according to the thickness of the wafers desired to be sliced off. The width of the groove is substantially the same as diameter φ of saw wire 2.

It should be noted that cutting apparatus 1 may include three or more guide rollers 3. Saw wires 2 may be looped over the three or more guide rollers 3.

Ingot holder 4 holds ingot 20 which is an object to be cut. Ingot holder 4 pushes ingot 20 through saw wires 2, and thereby ingot 20 is sliced by saw wires 2.

Tension releasing device 5 is a device that releases tension exerted on saw wire 2. Tension releasing device 5 is, for example, an elastic body such as a coiled or plate spring. As illustrated in FIG. 1, tension releasing device 5 that is a coiled spring, for example, has one end connected to guide roller 3 and the other end fixed to a predetermined wall surface. Tension releasing device 5 is capable of releasing the tension exerted on saw wire 2, by adjusting the position of guide roller 3.

It should be noted that, although not illustrated in the diagram, cutting apparatus 1 may be a cutting apparatus of a free abrasive particle type, and may include a feeder that feeds slurry to saw wires 2. The slurry is a cutting fluid such as a coolant including abrasive particles dispersed therein. The abrasive particles included in the slurry are fixed to saw wire 2, and thereby it is possible to easily cut ingot 20.

Figure 2:
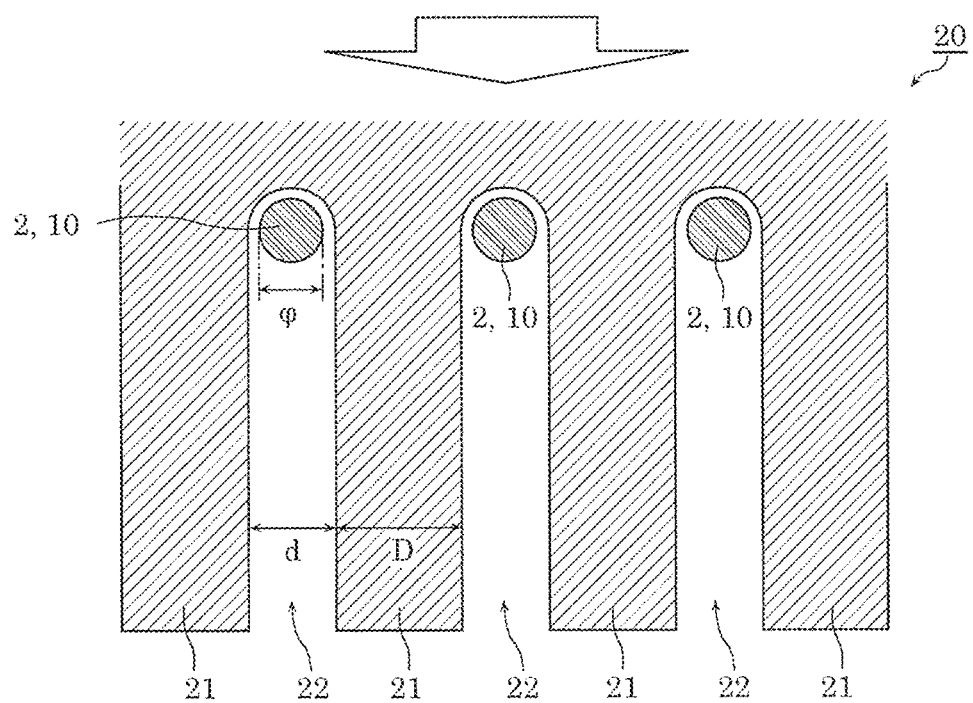
FIG. 2 is a cross-sectional view which illustrates how an ingot is sliced by the cutting apparatus according to the embodiment.

FIG. 2 is a cross-sectional view which illustrates how ingot 20 is sliced by cutting apparatus 1 according to the present embodiment. FIG. 2 illustrates a portion of the cross-section that is taken along the line II-II illustrated in FIG. 1 and that is orthogonal to the extending direction of saw wire 2 (i.e., an axial direction of metal wire 10). More specifically, FIG. 2 illustrates how three saw wires 2 among the plurality of saw wires 2 slice ingot 20.

By pushing ingot 20 through saw wires 2, ingot 20 is simultaneously divided into partly-sliced portions 21 by saw wires 2. Space 22 between neighboring partly-sliced portions 21 is a space made by ingot 20 being scraped off by saw wire 2. In other words, the size of space 22 is equivalent to a kerf loss of ingot 20.

Width d of space 22 depends on diameter φ of saw wire 2. Stated differently, width d increases as diameter φ of saw wire 2 becomes larger, and thereby, the kerf loss of ingot 20 increases. Width d decreases as diameter φ of saw wire 2 becomes smaller, and thereby, the kerf loss of ingot 20 decreases.

Specifically, width d of space 22 becomes larger than diameter φ. The difference between width d and diameter φ depends on the size of abrasive particles fixed to saw wire 2 and an oscillation width of the vibrations caused when saw wire 2 rotates. Here, the oscillation width of saw wire 2 can be reduced by tightly tensioning saw wire 2. The higher the tensile strength and elastic modulus of saw wire 2 are, the more tightly saw wire 2 can be tensioned. Thus, the oscillation width of saw wire 2 is reduced and thereby width d of space 22 can be reduced. As a result, it is possible to further reduce the kerf loss of ingot 20.

It should be noted that thickness D of partly-sliced portion 21 depends on the intervals at which saw wires 2 are disposed. Accordingly, saw wires 2 are disposed at intervals each resulting from adding up desired thickness D and a predetermined margin. More specifically, a margin is a difference between width d and diameter φ, and is a value determined in accordance with the oscillation width of saw wire 2 and the grain diameter of the abrasive particle.

Based on what has been described above, diameter φ, the tensile strength, and the elastic modulus of saw wire 2 are significant parameters in order to reduce the kerf loss of ingot 20. More specifically, by decreasing diameter φ of saw wire 2 or increasing the tensile strength and elastic modulus of saw wire 2, it is possible to reduce the kerf loss of ingot 20. Saw wire 2 according to the present embodiment has diameter φ smaller than a diameter of piano wire which generally is approximately 80 μm, and a tensile strength higher than or substantially equal to a tensile strength of piano wire which generally is 3500 MPa or higher.

The following describes the structure and manufacturing method of saw wire 2; that is, metal wire 10.

(Metal Wire)

Metal wire 10 is a metal wire which includes tungsten (W). A tungsten content of metal wire 10 is, for example, at least 90 wt % with respect to a total weight of metal wire 10. For example, the tungsten content may be at least 95 wt %, at least 99 wt %, or at least 99.9 wt %.

According to the present embodiment, metal wire 10 contains an alloy including tungsten and rhenium (Re), namely, ReW alloy. The rhenium content of metal wire 10 is, for example, at least 0.1 wt % and at most 10 wt % with respect to a total weight of tungsten and rhenium. For example, the rhenium content may be at least 0.5 wt % and at most 5 wt %. Although the rhenium content is 3 wt % as one example, it may be 1 wt %. The tensile strength of metal wire 10 increases with an increase in the rhenium content. However, when the rhenium content is excessively high, it becomes difficult to render metal wire 10 thinner.

Metal wire 10 containing the ReW alloy has a tensile strength that increases with a decrease in diameter φ. Accordingly, use of metal wire 10 containing the ReW alloy makes it possible to implement saw wire 2 which has small diameter φ and is high in tensile strength, and to reduce a kerf loss of ingot 20.

Specifically, the tensile strength of metal wire 10 is at least 4000 MPa. For example, the tensile strength of metal wire 10 may be higher than or equal to 4500 MPa, or may be higher than or equal to 5000 MPa.

In addition, an elastic modulus of metal wire 10 is at least 350 GPa and at most 450 GPa. It should be noted that the elastic modulus is longitudinal elastic modulus. In addition, an elastic modulus of piano wire is generally in a range of from 150 GPa to 250 GPa. In other words, metal wire 10 has an elastic modulus approximately twice as high as that of piano wire.

As having an elastic modulus higher than or equal to 350 GPa, metal wire 10 is resistant to deformation. Stated differently, metal wire 10 is less likely to elongate. Meanwhile, as having an elastic modulus lower than or equal to 450 GPa, it is possible to transform metal wire 10 to a certain degree. More specifically, since metal wire 10 can be bent, it is possible to easily loop metal wire 10 (saw wire 2) over and across guide rollers 3.

Metal wire 10 has diameter φ less than or equal to 60 μm. For example, diameter φ of metal wire 10 may be less than or equal to 40 μm, or may be less than or equal to 30 μm. Diameter φ of metal wire 10 is 20 μm, specifically. However, it may be 10 μm. It should be noted that, when fixing abrasive particles such as diamond particles to metal wire 10, diameter φ of metal wire 10 may be larger than or equal to 10 μm, for example.

Diameter φ of metal wire 10 is uniform. However, diameter φ of metal wire 10 need not be completely uniform, and may differ at different portions by a certain percentage such as 1%. Since diameter φ of metal wire 10 is less than or equal to 60 μm, metal wire 10 has elasticity and thus can be bent easily to a satisfactory extent. Accordingly, it is possible to easily loop metal wire 10 (saw wire 2) over and across guide rollers 3.

Metal wire 10 is, for example, a metal wire which has a substantially circular shape in the cross-section orthogonal to the axis of wire 10, but not limited to this example. The cross-section shape of metal wire 10 may be quadrilateral such as square, oval, or the like.

Metal wire 10 has an average crystal grain size of 0.20 μm or less, in the cross-section orthogonal to the axis of metal wire 10. The average crystal grain size is a value based on an average value of the number of crystals of the ReW alloy per unit area, in the cross-section orthogonal to the axis of metal wire 10. With a decrease in value of the average crystal grain size, the size of each crystal decreases; that is, the number of crystals increases.

Here, a relationship between the average crystal grain size and the tensile strength will be described with reference to FIG. 3 to FIG. 6.

Figure 3:
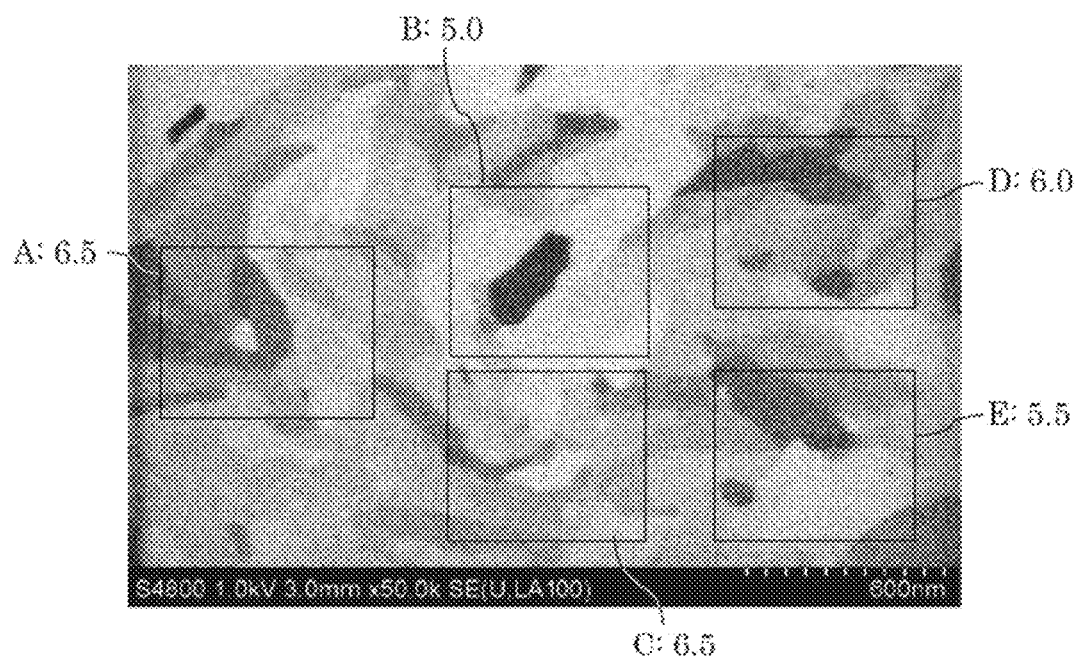
FIG. 3 is a cross-sectional view of a metal wire which has a tensile strength of 3800 MPa.
Figure 4:
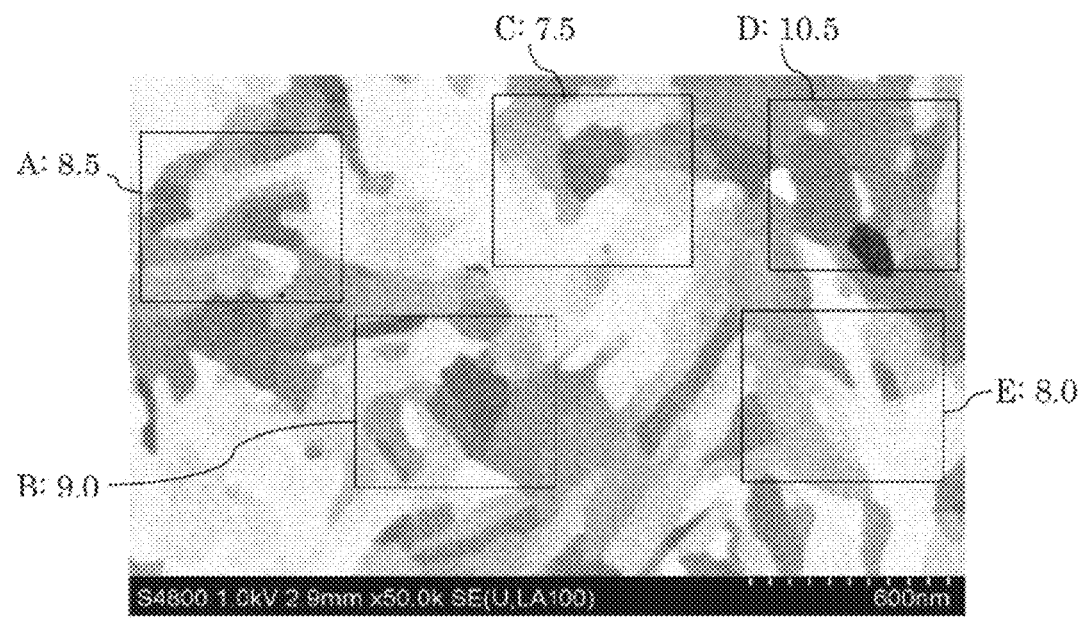
FIG. 4 is a cross-sectional view of a metal wire which has a tensile strength of 4000 MPa.
Figure 5:
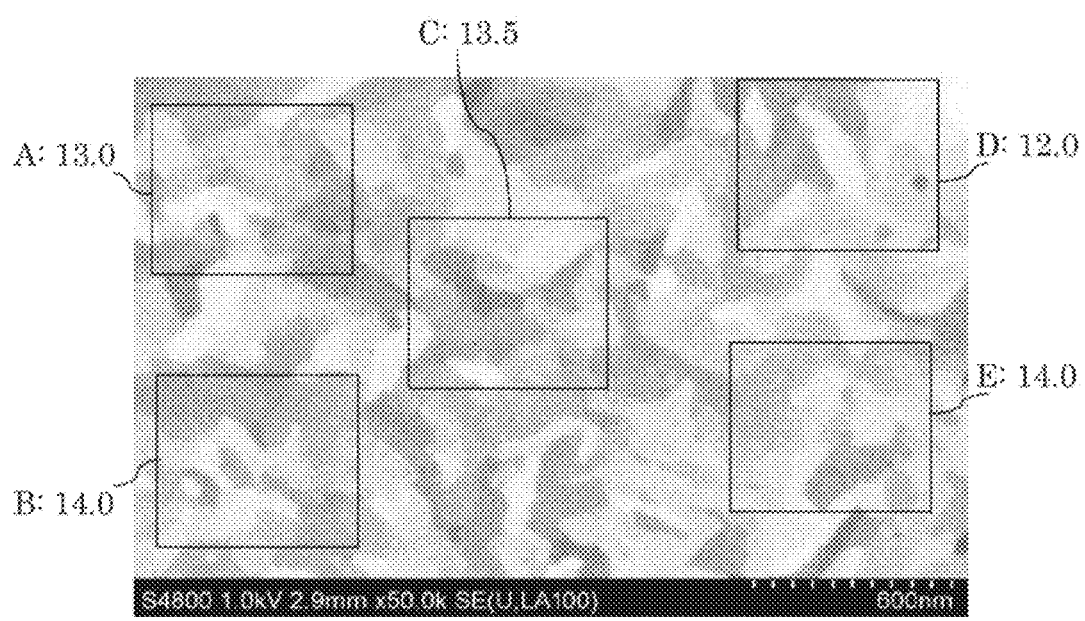
FIG. 5 is a cross-sectional view of a metal wire which has a tensile strength of 4400 MPa.

FIG. 3, FIG. 4, and FIG. 5 illustrate cross-sectional views of metal wire 10 having a tensile strength of 3800 MPa, 4000 MPa, and 4400 MPa, respectively. In each of the diagrams, metal wire 10 has diameter φ of 60 μm and the rhenium content of 0.1 wt %. Each diagram illustrates an image of a scanning ion microscope (SIM) of the cross-section of metal wire 10 that is cut vertically with respect to the axis of metal wire 10. In each of the diagrams, a region of a uniform depth (color) represents a single crystal.

The average crystal grain size is calculated by averaging crystal grain sizes in a plurality of target ranges. The crystal grain size, for example, can be measured by the planimetric method, targeting a range having an area of 600 nm×600 nm in the cross-section of metal wire 10. More specifically, the crystal grain size is calculated using Expression (1) below.

$$\text{Crystal grain size} = (\text{target area/the number of crystals})^{(1/2)} \quad (1)$$

It should be noted that, in Expression (1), "X^(½)" represents a square root of X.

The number of crystals included in each of five target ranges A to E was counted for each of three metal wires 10 illustrated in FIG. 3 to FIG. 5. Based on a result of the counting, an average value of the number of crystals and an average crystal grain size are calculated. Table 1 below shows the result of the counting and the result of the calculating.

TABLE 1

| Tensile strength [MPa] | Average crystal grain size [μm] | The number of crystals (600 nm × 600 nm) | | | | | |
|---|---|---|---|---|---|---|---|
| | | A | B | C | D | E | Average |
| 3800 | 0.25 | 6.5 | 5.0 | 6.5 | 6.0 | 5.5 | 5.9 |
| 4000 | 0.20 | 8.5 | 9.0 | 7.5 | 10.5 | 8.0 | 8.7 |
| 4400 | 0.16 | 13.0 | 14.0 | 13.5 | 12.0 | 14.0 | 13.3 |

It should be noted that, in the counting of the number of crystals, a crystal which is completely included in the target range is counted as one crystal, and a crystal which at least partially protrudes from the target range is counted as a ½ crystal. In each of FIG. 3 to FIG. 5, a numerical value following "A" to "E" indicates the number of crystals.

Figure 6:
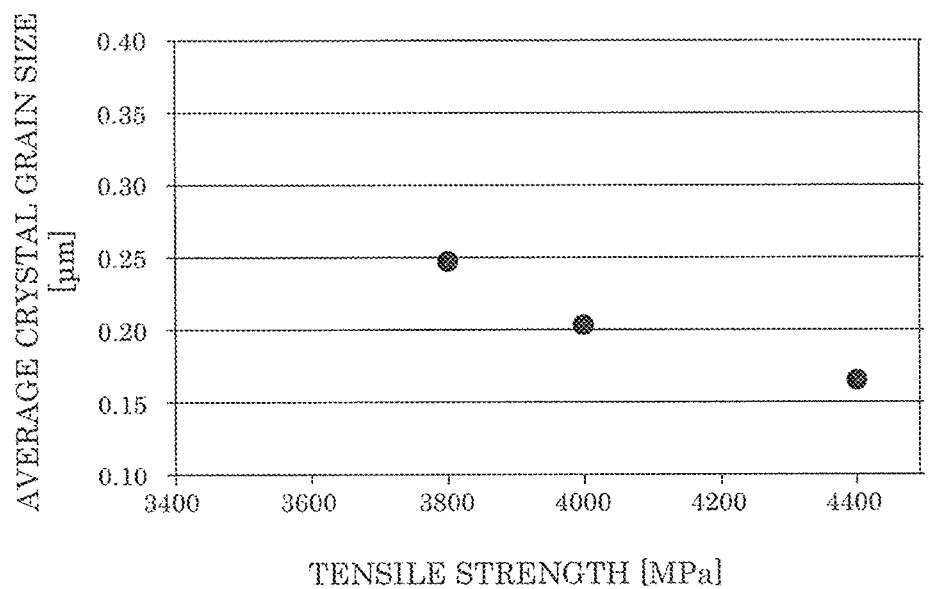
FIG. 6 is a diagram which illustrates a relationship between a tensile strength and an average crystal grain size of the metal wire according to the embodiment.

FIG. 6 is a diagram which illustrates a relationship between a tensile strength and an average crystal grain size of metal wire 10 according to the present embodiment. In FIG. 6, the horizontal axis indicates a tensile strength (MPa) of metal wire 10, and the vertical axis indicates an average crystal grain size (μm).

As indicated by Table 1 and FIG. 6, the tensile strength increases with a decrease in average crystal grain size. According to the present embodiment, the average crystal grain size of metal wire 10 is less than or equal to 0.20 μm. Accordingly, the tensile strength of metal wire 10 is greater than or equal to 4000 MPa. In other words, the tensile strength of metal wire 10 can be greater than or substantially equal to the tensile strength of piano wire. The average crystal grain size of metal wire 10 may be less than or equal to 0.16 μm, and in this case, the tensile strength of metal wire 10 is greater than or equal to 4400 MPa.

(Manufacturing Method of Metal Wire)

Figure 7:
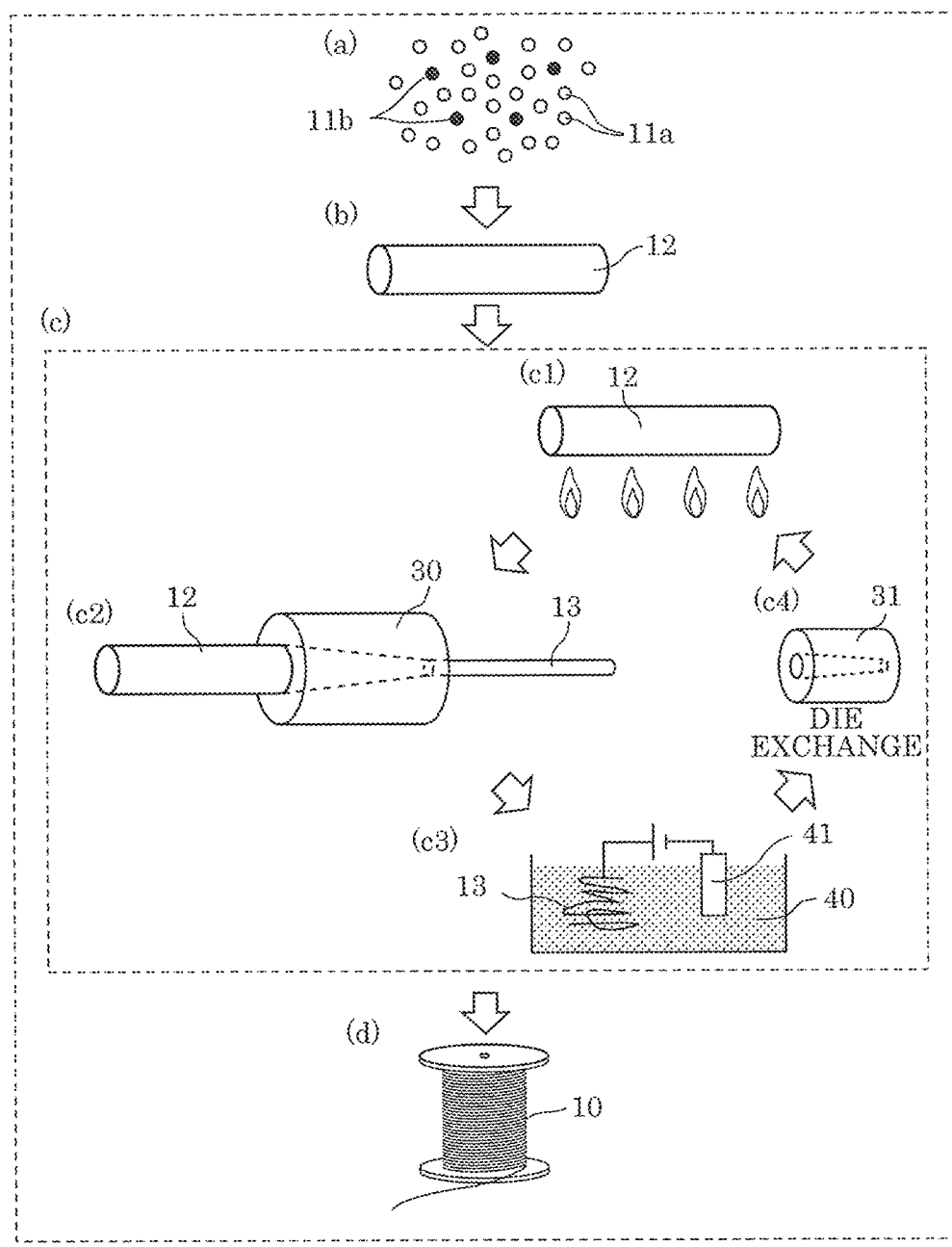
FIG. 7 is a state transition diagram which illustrates a manufacturing method of the metal wire according to the embodiment.

The following describes a manufacturing method of metal wire 10 (saw wire 2) having the above-described features, with reference to FIG. 7. FIG. 7 is a state transition diagram which illustrates the manufacturing method of metal wire 10 according to the present embodiment.

First, predetermined proportions of tungsten powder 11a and rhenium powder 11b are prepared, as illustrated in (a) in FIG. 7. More specifically, rhenium powder 11b is prepared in the range of from 0.1% to 10% of the total weight of tungsten powder 11a and rhenium powder 11b, and the rest is defined to be tungsten powder 11a. An average grain diameter of each of tungsten powder 11a and rhenium powder 11b is 5 μm, for example, but is not limited to this example.

Next, by pressing and sintering a mixture of tungsten powder 11a and rhenium powder 11b, a ReW ingot containing a rhenium-tungsten alloy is produced. By performing, onto the ReW ingot, a swaging processing of extending an ingot by press-forging the ingot from its periphery, wire-shaped ReW filament 12 is produced, as illustrated in (b) in FIG. 7. For example, wire-shaped ReW filament 12 has a diameter of approximately 3 mm whereas the ReW ingot which is a sintered body has a diameter of approximately 15 mm.

Next, drawing processing using wire drawing dies is carried out, as illustrated in (c) in FIG. 7.

To be specific, firstly, ReW filament 12 is annealed, as illustrated in (c1) in FIG. 7. More precisely, ReW filament 12 is heated not only directly with a burner, but also by being applied with electrical current therethrough. The annealing process is performed in order to eliminate processing distortion generated in the swaging or drawing processing.

Next, drawing of ReW filament 12 using wire drawing die 30, namely, a wire drawing process, is performed, as illustrated in (c2) in FIG. 7. It should be noted that since ReW filament 12 is rendered ductile after having been heated in the previous step of annealing process, wire drawing can be easily carried out. By reducing the diameter size of ReW filament 12, the strength of ReW filament 12 per an area of a cross-section increases. In other words, ReW filament 13 whose diameter size is reduced in the wire drawing process has a tensile strength per an area of the cross-section greater than that of ReW filament 12. It should be noted that the diameter of ReW filament 13 is, for example, 0.6 mm, but is not limited to this example.

Next, through the electrolytic polishing of ReW filament 13 after the drawing process, the surface of ReW filament 13 is rendered smooth, as illustrated in (c3) in FIG. 7. The electrolytic polishing process is carried out by conducting electricity between ReW filament 13 and counter electrode 41 such as a carbon rod, in the state in which ReW filament 13 and counter electrode 41 are bathed into electrolyte 40, e.g., aqueous sodium hydroxide.

Next, die exchange is performed, as illustrated in (c4) in FIG. 7. More specifically, wire drawing die 31 with a pore diameter smaller than that of wire drawing die 30 is selected as a die to be used in the next drawing processing. It should be noted that wire drawing dies 30 and 31 are, for example, diamond dies containing sintered diamond, single-crystal diamond, or the like.

The processes from (c1) to (c4) illustrated in FIG. 7 are repeatedly performed until the diameter of ReW filament 13 is thinned down to a desired diameter (specifically, less than or equal to 60 μm). At this time, the drawing process illustrated in (c2) in FIG. 7 is performed by adjusting the form as well as hardness of wire drawing die 30 or 31, a lubricant to be used, and the temperature of a ReW filament, in accordance with the diameter of the ReW filament to be processed.

Similarly, in the annealing process illustrated in (c1) in FIG. 7, annealing conditions are adjusted in accordance with the diameter of the ReW filament to be processed. Through the annealing process, an oxidation product is fixed to the surface of the tungsten wire. It is possible to adjust the amount of oxidation products to be fixed to the surface of the ReW filament, by adjusting the annealing conditions.

More specifically, the larger the diameter of the ReW filament is, at a higher temperature the ReW filament is annealed, and the smaller the diameter of the ReW filament is, at a lower temperature the ReW filament is annealed. For example, in the case where the diameter of the ReW filament is large, the ReW filament is annealed specifically at a temperature between 1400 degrees Celsius and 1800 degrees Celsius in the annealing process carried out in the first drawing processing. In the final annealing process carried out in the final drawing processing in which the ReW filament is thinned down to finally have a desired diameter, the ReW filament is heated at a temperature between 1200 degrees Celsius and 1500 degrees Celsius. It should be noted that, in the final annealing process, electricity need not be conducted to the ReW filament.

Moreover, an annealing process may be omitted when the drawing processing is repeated. For example, the final annealing process may be omitted. More specifically, in order to decrease the crystal grain size, the final annealing process may be omitted and a lubricant as well as the form and hardness of a wire drawing die may be adjusted. It is possible to decrease the average crystal grain size by, for example, omitting the final annealing process. In addition, the average crystal grain size can be further decreased with a decrease in heating temperature applied to the wire during the wire drawing process. In addition, crystal orientations are also easily uniformed to process preferred orientation <110>.

With the processes as described above, metal wire 10 (saw wire 2) is manufactured as illustrated in (d) in FIG. 7.

It should be noted that FIG. 7 schematically illustrates each of the processes of the manufacturing method of metal wire 10. Each of the processes may be performed separately, or may be performed through an in-line process. For example, a plurality of wire drawing dies may be aligned in a descending order of pore diameters in a production line, and heating devices for conducting an annealing process, electrolytic polishing devices, or the like may be placed between the wire drawing dies.

[Advantageous Effect, Etc.]

As described above, metal wire 10 according to the present embodiment is a metal wire containing tungsten. In metal wire 10, a tungsten content of metal wire 10 is at least 90 wt %, a tensile strength of metal wire 10 is at least 4000 MPa, an elastic modulus of metal wire 10 is at least 350 GPa and at most 450 GPa, a diameter of metal wire 10 is at most 60 μm, and an average crystal grain size of metal wire 10 in a cross-section orthogonal to an axis of metal wire 10 is at most 0.20 μm.

As described above, since metal wire 10 contains tungsten, metal wire 10 is high in an elastic modulus and hardness. In addition, as metal wire 10 is rendered thinner, the tensile strength increases and thereby tolerance against breakage is improved. Diameter φ of metal wire 10 is loss than or equal to 60 μm and the average crystal grain size of metal wire 10 is less than or equal to 0.20 μm, and thus the tensile strength of metal wire 10 is increased to greater than or equal to 4000 MPa.

As described above, according to the present embodiment, it is possible to implement metal wire 10 which is thin and high in the tensile strength, elastic modulus, and hardness.

Accordingly, saw wire 2 including metal wire 10 is high in the tensile strength, and thus it is possible to loop saw wire 2 over and across guide rollers 3 with a strong tension. It is thus possible to reduce the vibrations of saw wire 2 caused during the process of cutting ingot 20. Furthermore, since saw wire 2 has sufficiently small diameter φ that is as small as 60 μm, it is possible to reduce the kerf loss of ingot 20. Accordingly, it is possible to increase the number of wafers cut out from a single ingot 20.

In addition, for example, the tensile strength of metal wire 10 is at least 4500 MPa.

With this, since the tensile strength of metal wire 10 is further greater, it is possible, for example, to loop metal wire 10 (saw wire 2) over and across guide rollers 3 with a stronger tension. Thus, it is possible to further reduce the vibrations of saw wire 2 caused during the process of cutting ingot 20, and thus possible to further reduce the kerf loss of ingot 20.

In addition, for example, metal wire 10 contains a rhenium-tungsten alloy, and a rhenium content of metal wire 10 is at least 0.1 wt % and at most 10 wt %.

With this, since metal wire 10 contains the ReW alloy, it is possible to obtain metal wire 10 which has a tensile strength greater than a tensile strength of a pure tungsten wire. Accordingly, metal wire 10 has improved tolerance against breakage even after the thinning process, and therefore, it is possible to realize a tensile strength greater than or substantially equal to a tensile of piano wire. Thus, according to the present embodiment, it is possible to provide saw wire 2 which is thinner than piano wire, has an elastic modulus approximately twice as high as an elastic modulus of piano wire, and has a tensile strength greater than or substantially equal to a tensile of piano wire.

(Variation)

Here, a variation of the above-described embodiment will be described. The following description focuses on the difference from the above-described embodiment, and description for common points are omitted or simplified.

A metal wire according to the present variation includes tungsten doped with potassium (K), instead of the ReW alloy. In other words, the metal wire is a pure tungsten wire doped with potassium. A tungsten content (the degree of purity) of the metal wire is, for example, at least 99 wt %, or may be at least 99.9 wt %.

A potassium content of the metal wire is, for example, at most 0.01 wt % with respect to a total weight of tungsten and potassium, but is not limited to this example. For example, the potassium content of the metal wire may be at least 0.005 wt % and at most 0.010 wt %.

The metal wire containing tungsten doped with potassium (potassium-doped tungsten wire) has a tensile strength that increases with a decrease in diameter φ. Stated differently, with the use of the potassium-doped tungsten wire, it is possible to implement saw wire 2 which has small diameter φ and is high in tensile strength, and thereby to reduce the kerf loss of ingot 20.

The tensile strength, elastic modulus, diameter φ, average crystal grain size, etc. of the saw wire according to the present variation are respectively the same as those of metal wire 10 according to the embodiment. It should be noted that the average crystal grain size is calculated based on the number of crystals of tungsten. In the metal wire according to the present variation, potassium is present in a tungsten grain boundary.

As described above, metal wire 10 according to the present variation contains the tungsten doped with potassium, and a potassium content of metal wire 10 is at most 0.01 wt %.

As described above, since tungsten contains a subtle amount of potassium, crystal grain growth in the radial direction of the metal wire is inhibited. Accordingly, the saw wire according to the present variation is greater in strength at a high temperature than the case where one-hundred percent pure tungsten is used.

It should be noted that the potassium-doped tungsten wire can be manufactured by a manufacturing method similar to the manufacturing method of the ReW alloy wire, by using potassium-doped tungsten powders instead of tungsten powders 11a and rhenium powders 11b.

(Others)

Although the metal wire and the saw wire according to the present disclosure have been described based on the above-described embodiment and the variation thereof, the present disclosure is not limited to the above-described embodiment.

For example, although the case where saw wire 2 is quite simply metal wire 10 has been described in the above-described embodiment and the variation thereof, the present disclosure is not limited to this example. Saw wire 2 may include metal wire 10 and a plurality of abrasive particles included in a surface of metal wire 10. In this case, a nickel plating layer for holding the abrasive particles may be provided on the surface of metal wire 10. More specifically, saw wire 2 may be a wire used in a free abrasive particle system as described in the embodiment, or a wire used in a fixed abrasive particle system. Examples of the abrasive particles include diamond, cubic boron nitride (CBN), etc.

Moreover, cutting apparatus 1 is not limited to a multi-wire saw, and may be, for example, a wire sawing apparatus that cuts out a wafer one by one by slicing ingot 20 using one saw wire 2. In addition, cutting apparatus 1 illustrated in FIG. 1 is merely an example, and thus need not include tension releasing device 5, for example.

In addition, for example, metal wire 10 according to the above-described embodiment may be used for an application other than the saw wire. For example, it is possible to manufacture a metal mesh by performing waving with a plurality of metal wires 10 being warp and weft. The metal mesh can be used for a mesh for screen printing, for example.

Alternatively, metal wire 10 may be used for, for example, an inspection probe, a guide wire of catheter, or the like. In addition, metal wire 10 includes fine crystals and is high in strength, and thus can be used for a wire for a high temperature. It should be noted that, for example, when metal wire 10 is used for a probe, metal wire 10 may be thinned at a tip end. Stated differently, metal wire 10 may have a diameter which is not uniform.

In addition, for example, although the case where metal wire 10 contains the rhenium-tungsten alloy has been described in the above-described embodiment, the present disclosure is not limited to this example. Metal wire 10 may contain an alloy of tungsten and metal of at least one type different from tungsten. The metal different from tungsten is, for example, a transition metal, and specifically, iridium (Ir), ruthenium (Ru), osmium (Os), or the like. The content of the metal different from tungsten is, for example, at least 0.1 wt % and at most 10 wt % as with the rhenium content, but is not limited to this example. The rhenium content or the content of the metal different from tungsten may be less than 0.1 wt % or may be greater than 10 wt %.

In addition, metal wire 10 may be substantially a one-hundred percent pure tungsten wire which does not include impurity. The pure tungsten wire can be manufactured by a manufacturing method similar to the manufacturing method of the ReW alloy wire, by using only tungsten powders without mixing rhenium powders.

It should be noted that the present disclosure also includes other forms in which various modifications apparent to those skilled in the art are applied to the embodiment or forms in which structural components and functions in the embodiment are arbitrarily combined within the scope of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A metal wire containing tungsten, wherein
a tungsten content of the metal wire is at least 90 wt %,
a tensile strength of the metal wire is at least 4000 MPa,
an elastic modulus of the metal wire is at least 350 GPa and at most 450 GPa,
a diameter of the metal wire is at most 60 μm, and
an average crystal grain size of the metal wire in a cross-section orthogonal to an axis of the metal wire is at most 0.20 μm.

2. The metal wire according to claim 1, wherein
the tensile strength of the metal wire is at least 4500 MPa.

3. The metal wire according to claim 1, wherein
the tensile strength of the metal wire is greater than 5000 MPa.

4. The metal wire according to claim 1, wherein
the average crystal grain size is at most 0.16 μm.

5. The metal wire according to claim 1, wherein
the metal wire contains a rhenium-tungsten alloy, and
a rhenium content of the metal wire is at least 0.1 wt % and at most 10 wt %.

6. The metal wire according to claim 1, wherein
the metal wire contains the tungsten doped with potassium, and
a potassium content of the metal wire is at most 0.01 wt %.

7. The metal wire according to claim 6, wherein
the potassium content of the metal wire is at least 0.005 wt %.

8. A metal wire containing tungsten, wherein
a tungsten content of the metal wire is at least 90 wt %,
a diameter of the metal wire is at most 60 μm, and
an average crystal grain size of the metal wire in a cross-section orthogonal to an axis of the metal wire is at most 0.20 μm.

9. A saw wire, comprising the metal wire according to claim 1.

10. A cutting apparatus, comprising the saw wire according to claim 9.

11. A method of manufacturing a metal wire containing tungsten, the method comprising:
forming the metal wire, wherein
a tungsten content of the metal wire is at least 90 wt %,
a tensile strength of the metal wire is at least 4000 MPa,
an elastic modulus of the metal wire is at least 350 GPa and at most 450 GPa,
a diameter of the metal wire is at most 60 μm, and
an average crystal grain size of the metal wire in a cross-section orthogonal to an axis of the metal wire is at most 0.20 μm.

12. The method according to claim 11, wherein
the forming includes repeatedly performing a plurality of processes in sequence, and
the plurality of processes includes a wire drawing process, a polishing process, and a die exchange process.

* * * * *